A. JORDAN.
Mail-Bag Catcher.
No. 50,435.
Patented Oct. 10, 1865.
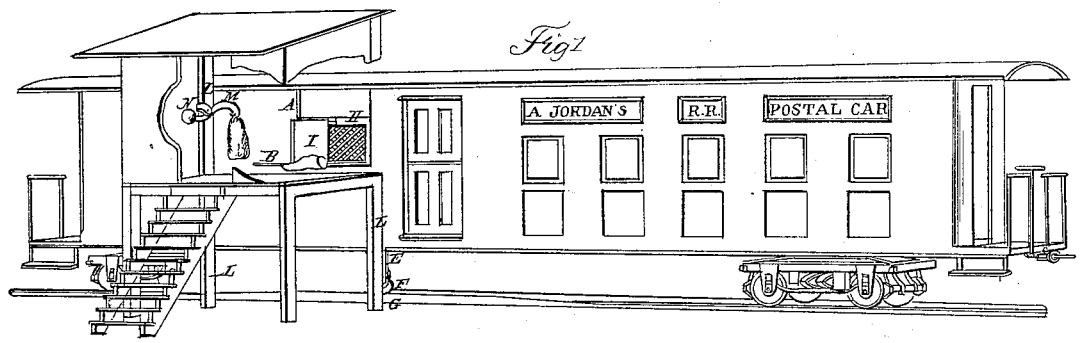
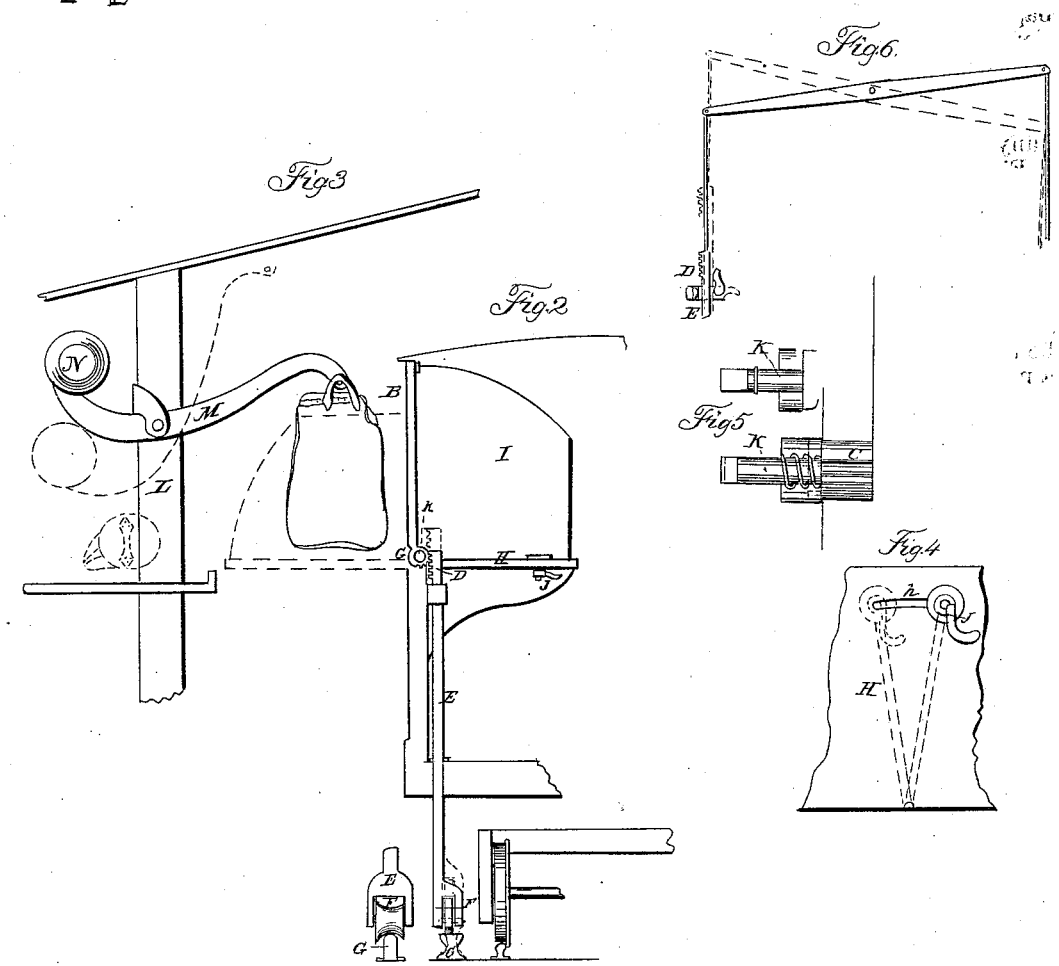

UNITED STATES PATENT OFFICE.

AUGUSTUS JORDAN, OF WASHINGTON, DISTRICT OF COLUMBIA.

APPARATUS FOR RECEIVING AND DELIVERING MAILS ON RAILROAD-CARS.

Specification forming part of Letters Patent No. 50,435, dated October 10, 1865.

*To all whom it may concern:*

Be it known that I, AUGUSTUS JORDAN, of the city of Washington, in the District of Columbia, have invented a new and useful Improvement in Railway-Cars, whereby mail-bags, packages, &c., may be delivered at stations and received in the car while the same is in motion; and I do hereby declare the following to be a full, clear, and exact description of the same, reference being had to the accompanying drawings, in which—

Figure 1 is a perspective view, representing a railroad postal car in the act of receiving and delivering mail-bags while passing a station. Fig. 2 is a vertical cross-section, showing the shutter and the mechanism by which it is operated. Fig. 3 is a part of the station, showing the manner of suspending the bag to taken on the car. Fig. 4 is an elevation of a part of the shutter, showing the brake designed to relieve the concussion. Fig. 5 shows two modifications of the journal upon which the shutter vibrates. Fig. 6 shows a method of tricing up the rod which opens the shutter.

The nature of my invention consists in arranging the devices designed to deliver and receive the mail-bags, packages, &c., so that they shall rotate upon a horizontal axis which is parallel with the direction of the car's motion, and also by causing said devices to be operated by a stationary cam or camber rail attached to or near the track-rail, and therefore more conveniently constructed and attached; and, also, in operating said devices by means of a rack and pinion or equivalent devices located very near the center of motion of the shutter, and thereby causing a comparatively slight elevation of the cam or camber rail, sufficient to produce the requisite motion of said shutter.

That others may understand its construction and operation, I will particularly describe it.

At any convenient part of the side of the car I make an opening about four feet square, or of any other proper proportion and size. This opening is shown at A, Fig. 1.

To the lower edge of the opening A, I attach metallic boxes, in which the journals or hinges of the shutter B rotate. The shutter B is of proper size to close the opening A, and is opened and closed by means of the pinion C, operated by the rack D, which, in turn, is actuated by the rod E, the roller F at whose lower end travels over the stationary cam or camber rail G.

Upon the lower edge of the shutter B, and projecting horizontally into the car when said shutter is closed, I attach the shelf H, Figs. 1 and 2, and I also attach the partition I midway of the shutter B and shelf H, and projecting vertically to each of them. The partition I is attached by journals or pivots to the inner side of the shutter so that it may have a vibratory movement, as shown by dotted lines in Fig. 4, said vibration being limited by the curved slot $h$, Fig. 4, through the shelf H. A tang from the partition I projects through the slot $h$, and has upon its end a washer and nut, J, so that the movement of the partition may be rendered more or less difficult, according as the said nut J is more or less tightly set down.

Around the journals K of the shutter B, or at the ends of the same, or in some other convenient location, I place springs for the purpose of relieving the shock incident to the reception of a mail-bag or other heavy object against the partition I when the shutter is opened for that purpose. I consider it necessary to provide some elastic medium of this sort for the purpose of saving the working devices from injury; but it is perfectly immaterial at what part of the apparatus such elastic media may be placed.

The rod E, having the rack D at its upper end, is provided with suitable bearings at its upper end, and also at the point where it passes through the floor of the car, and, if found necessary, it may also be supported by a bearing below the floor of the car.

The stationary cam or camber rail G is placed at each station along the road where a mail or packages are to be left. It consists of a double-inclined plane joined at the highest points by a level track of some four or five feet, more or less. The rise above the level of the track-rail should be only some four or five inches, according to the size of the pinion C, and the inclined portions should rise as abruptly as may be found safe and practicable, so that the shutter B may be opened as suddenly as consistent with the safety of the machinery. The rail G may be placed quite near the track-rail, and, if the construction of the car and other parts of the working device will permit, it would be better to place it in contact with the track-rail, as there will then be less likelihood of accidental or designed mischief to those devices herein described by sticks, stones, &c., near the track. The level portion of the rail serves to keep the shutter open for a moment while the mail or package to be taken on board is being received.

At the side of the track, but at a distance of some five feet therefrom, a post or posts, L, are erected. From these posts the bags of mail-matter or packages are suspended when they are to be put on board the car. I attach a weighted arm, M, for this purpose, and hang the bag or package upon its outer end, as shown in Figs. 1 and 3. That end is thereby drawn down as far as the arm can move, and the mail or package is then suspended, as shown in Figs. 1, 2, and 3, so that as the car passes and the shutter opens it will be swept off and conveyed by the closing shutter to the interior of the car. As soon as the mail or package is removed from the outer end of the arm M the weight N at the other end sinks down so as to cause the arm to assume a vertical position, as shown by red lines in Fig. 3, and be thereby placed out of the reach of accidental contact with any other car or object connected to the train.

Attached to the posts L should be a platform, upon which to receive the bag or package thrown out from the car; and there should also be a roof provided for the purpose of shelter during storms. The front edge of the platform should be provided with a vertical ledge to prevent the bag from rolling or rebounding onto the track when thrown from the car. Such a station is represented in Fig. 1, the sides being broken away to exhibit the interior.

It may be necessary on some roads to remove the wheel F from danger between stations, and in order to do so I provide means for disconnecting the rack D from the pinion C. This may readily be done by slipping the rod E and rack D backward, as shown in Fig. 6, when, the teeth of the rack being freed from the teeth of the pinion, the rod E may be raised up bodily by levers or any other suitable means; or the rod E may be jointed below the floor of the car, so that the wheel F may be turned up and thus removed from the track. Necessity for these arrangements it is thought will not exist.

The operation of my device is very simple, and may be explained in a few words. The attendant whose business it is loosens the nut J and moves the partition I until the tang reaches the forward end of the slot h. The nut J is then tightened again, and acts as a brake, which allows the partition to yield to the shock of the bag or package received without in any degree recoiling. The advantage of this will be apparent when it is considered that this shock will sometimes be pretty severe, and if the bag or package was received upon an elastic cushion or upon any elastic surface whatever the recoil might throw the bag or package forward, and even entirely from the shutter, and thus defeat the object of the apparatus, for it is obvious that there must be much more difficulty in taking the bag or package on board than in delivering the same from the car. I therefore, after careful investigation of various elastic arrangements for this partition, decided the non-elastic brake to be preferable. The bag to be delivered from the car is laid upon the shelf H at the rear side of the partition I, and the bag to be taken on board is hung upon the arm M on the side of the station opposite to that which the train is approaching. The hanging bag then is suspended, as shown in Figs. 1, 2, and 3, within a few inches of the side of the car, and so that its bottom will be a few inches higher than the shutter B when opened. At the proper instant the wheel F comes in contact with the rail G, and as it rises upon the inclined surface of the same the rack D causes the pinion C to revolve, and the shutter B and shelf H to rapidly rotate upon the journals K. The rapidity of this rotation throws or slides the bag forward in a direction at right angles to the axis of the car, and it is received upon the platform of the station prepared for it. At the same instant the hanging bag is caught by the partition I, which yields to the shock, and thereby breaks its force, and the wheel F descends the other inclination of the rail G, causing the shutter to close up, and depositing the bag on the shelf H as it again becomes horizontal.

In order to avoid the use of springs to close the shutter when the mail has been received, I cause the rod E to be made sufficiently heavy for that purpose, as a simple weight will be much less liable to derangement than any spring arrangement that could be devised.

The pinion C may be replaced by a frictional arrangement similar to the well-known bow-drill stock, if it should be deemed more desirable, or by any of the well-known methods of converting rectilinear into circular motion.

The springs around or at the ends of the journals K are designed to be quite stiff, and to yield but very little, merely sufficient to relieve those parts of the machinery from violent shock.

The shelf H, I prefer to make of grating, as represented, for the reason that less dust will accumulate, and also to allow the attendant within the car to see the operation each time the apparatus is brought into use. The partition I may also advantageously be made in the same manner, and will then offer less resistance to the air when opened. After each operation the partition should be replaced, as before stated, and any convenient means of applying a stop to regulate the pressure of the nut J may be adopted.

Among the advantages secured by my arrangements I desire to notice the following:

First. There are no permament projections beyond the sides of the car anywhere, except beneath, where the rod E depends, and therefore there can be no danger of contact with any permanent work of the road, nor with any accidental obstacle which the car itself will pass; for if there be anything upon or near the track that might strike the rod E or roller F it will be removed by the cow-catcher, and any obstruction above the track will be removed by the other parts of the locomotive or forward car. A postal-car with my attachment, then, will pass any tunnel, bridge, or other work where the same car without it would pass.

Second. There is no danger of clogging the working parts of my device by accumulations of ice or snow.

Third. The bag or package is received upon a vertical surface, and motion is imparted to it in a direct line without any possibility of tangential motion and the consequent abrasion. The bag will be deposited gently upon the shelf H as the shutter closes, and will not be projected or shot into the car to the danger of damage to the persons within the car or to the contents of the bag or package.

Fourth. The apparatus, working upon an axis, will operate with much greater ease, there being less friction, and may, therefore, receive the moving power much nearer the center of motion, and therefore, in turn, the amount of motion of the moving power will be correspondingly decreased.

Fifth. By receiving the bag or package upon a partition or surface that can yield without reacting the force of the shock of such reception may be broken without any of the dangers of reaction incident to an elastic surface.

Sixth. The ease with which the operating mechanism may be thrown out of gear (see Fig. 6) so that no temporary, designed, or accidental obstruction in the line of the roller F can operate the shutter so as to throw out the mail at any other than the proper time.

Seventh. By placing elastic substances or springs at the ends of the journals, upon which the delivering and receiving devices move, all evil effects of the shock will be obviated and the apparatus thus rendered much more durable.

Eighth. By placing the stationary cam or camber rail beneath the car rather than in any other position the following advantage is secured, viz.: The minimum disturbance by the swaying or rocking of the car in consequence of slight inequalities in the track; for the rocking motion of the car is upon a point very near to the upper side of the truck, or at that point where the car rests upon the truck, and by placing the stationary cam near the track the point of contact between it and the roller F is brought as near to the point upon which the car sways as possible, and therefore the unequal action of the devices must be much less than if such distance be increased, as it will be if they receive their motion from the top or side of the car.

Having described my invention, what I claim as new, and desire to secure by Letters Patent, is—

1. The shutter B, opening and closing upon a horizontal axis parallel with the direction of the car's movement, substantially as described.

2. In combination with the shutter B, the shelf H and partition I, substantially as and for the purpose set forth.

3. In combination with the shutter B, the pinion C and rack D, substantially as described.

4. In combination with the partition I, the set-nut J, substantially as described, and for the purpose set forth.

5. Giving an automatic movement to the part or parts by which mails or packages are received into or delivered from railroad-cars when in motion by the stationary cam or camber rail G, placed beside the railroad-track rail, as described, in combination with the rod E and roller F.

AUGS. JORDAN.

Witnesses:
ANDREW WHITELEY,
R. D. O. SMITH.